(12) United States Patent
Cutcher

(10) Patent No.: US 6,877,948 B2
(45) Date of Patent: Apr. 12, 2005

(54) WIND TURBINE GENERATOR

(76) Inventor: Alan B. Cutcher, 11918 Highway 183, Vernon, TX (US) 76384-7135

( * ) Notice: Subject to any disclaimer, the term of this patent is extended or adjusted under 35 U.S.C. 154(b) by 0 days.

(21) Appl. No.: 10/191,734

(22) Filed: Jul. 8, 2002

(65) Prior Publication Data

US 2003/0056506 A1 Mar. 27, 2003

Related U.S. Application Data

(60) Provisional application No. 60/304,535, filed on Jul. 10, 2001.

(51) Int. Cl.[7] ............................................. F03D 3/04
(52) U.S. Cl. ...................................... 415/4.4; 415/905
(58) Field of Search ........................ 415/4.1, 4.3, 4.4, 415/4.5, 905; 290/55

(56) References Cited

U.S. PATENT DOCUMENTS

| | | | | |
|---|---|---|---|---|
| 4,018,051 A | * | 4/1977 | Gay | 415/4.3 |
| 4,179,007 A | * | 12/1979 | Howe | 416/55 |
| 4,321,476 A | * | 3/1982 | Buels | 415/4.3 |
| 5,394,016 A | * | 2/1995 | Hickey | 415/4.1 |
| 6,041,596 A | * | 3/2000 | Royer | 415/4.3 |

FOREIGN PATENT DOCUMENTS

| | | | | |
|---|---|---|---|---|
| DE | 3844376 A1 | * | 7/1990 | F03D/3/04 |
| GB | 2264754 A | * | 9/1993 | F03D/3/04 |

* cited by examiner

Primary Examiner—F. Daniel Lopez
Assistant Examiner—Richard A Edgar
(74) Attorney, Agent, or Firm—W. Thomas Timmons

(57) ABSTRACT

A wind turbine generator is disclosed which includes a hub, a plurality of wind driven blades arranged around the hub, a drive belt or drive chain or other mechanical drive driven by the plurality of blades, an electric generator driven by the mechanical drive; and a boxlike frame forming a wind blocking wall for blocking wind from blowing against any of the plurality of wind driven blades in the reverse direction. In one arrangement, the wind turbine generator further includes two oil or gas tanks, and the boxlike frame is placed between the tanks to take advantage of the natural wind channeling between the two tanks. In another arrangement, the wind turbine generator further includes a house or building and the boxlike frame is built into the side of the house or building. The boxlike frame is also built into the top of a roof or the middle of a roof in other arrangements.

6 Claims, 4 Drawing Sheets

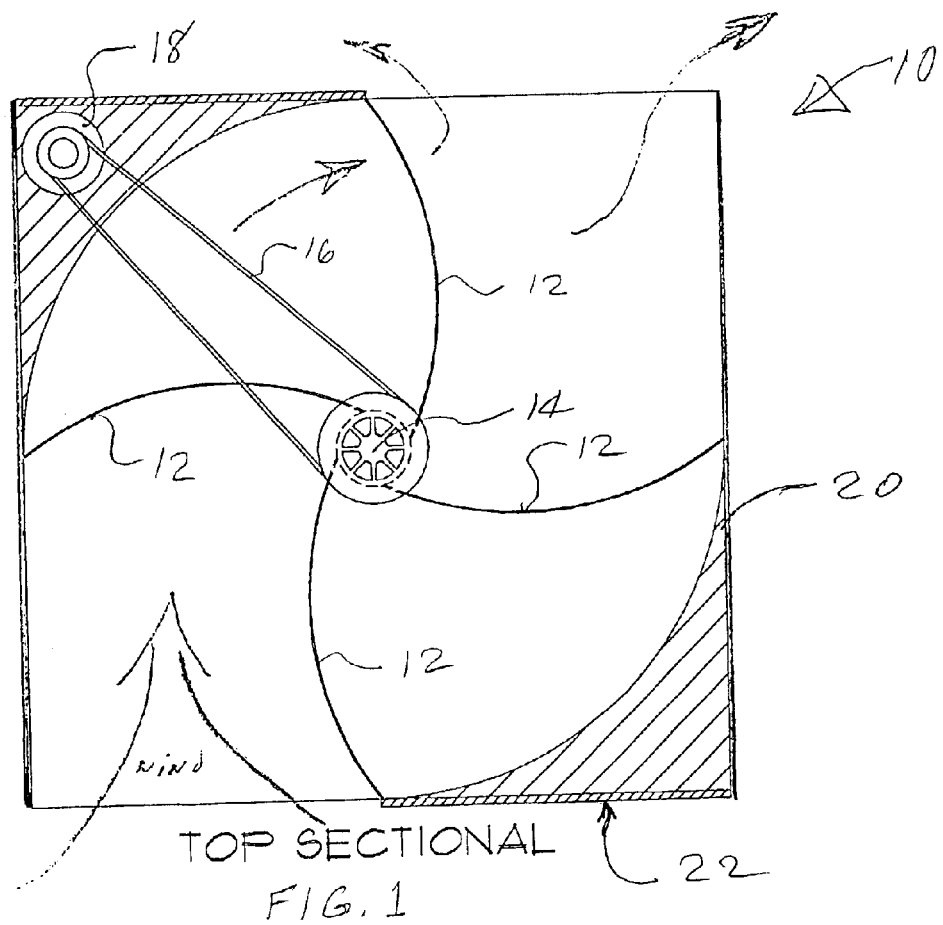
TOP SECTIONAL
FIG. 1
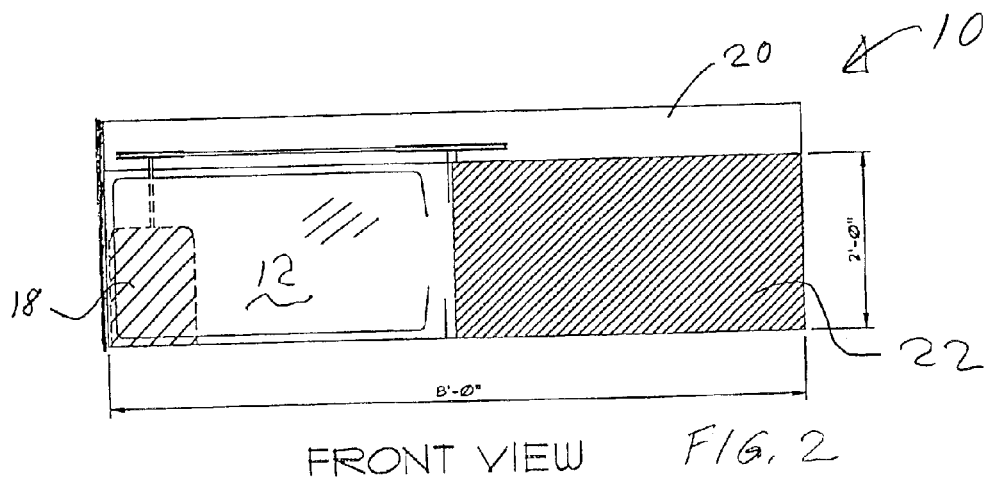
FRONT VIEW   FIG. 2

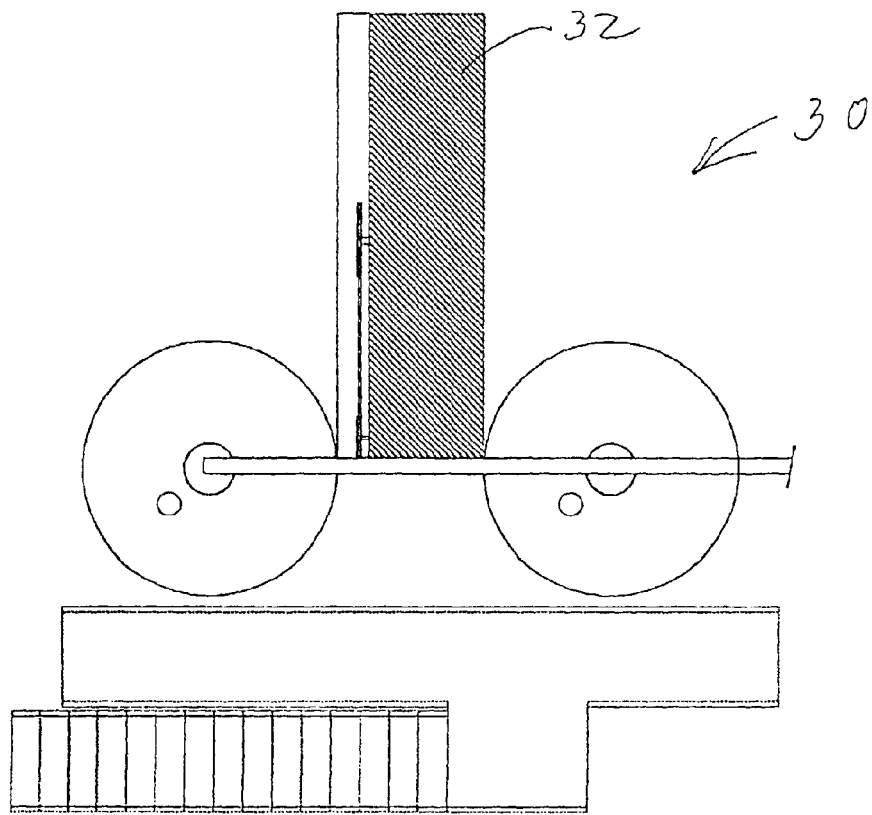
TOP VIEW  FIG. 3
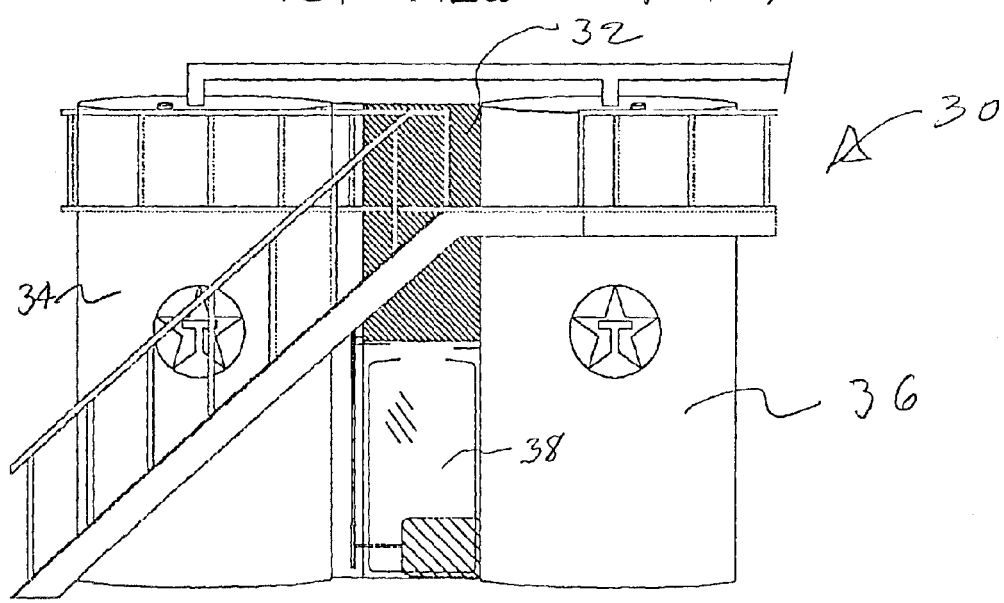
TANK BATTERY  FIG. 4

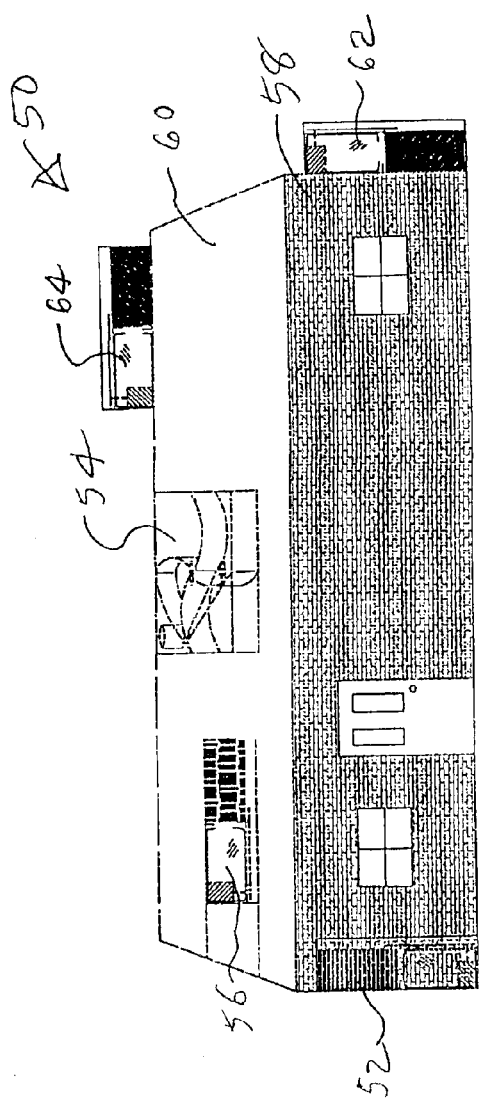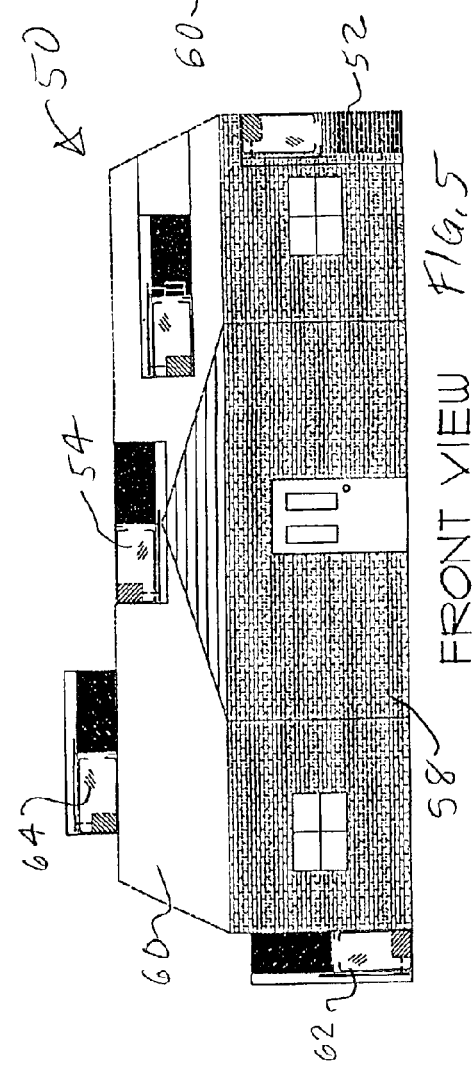

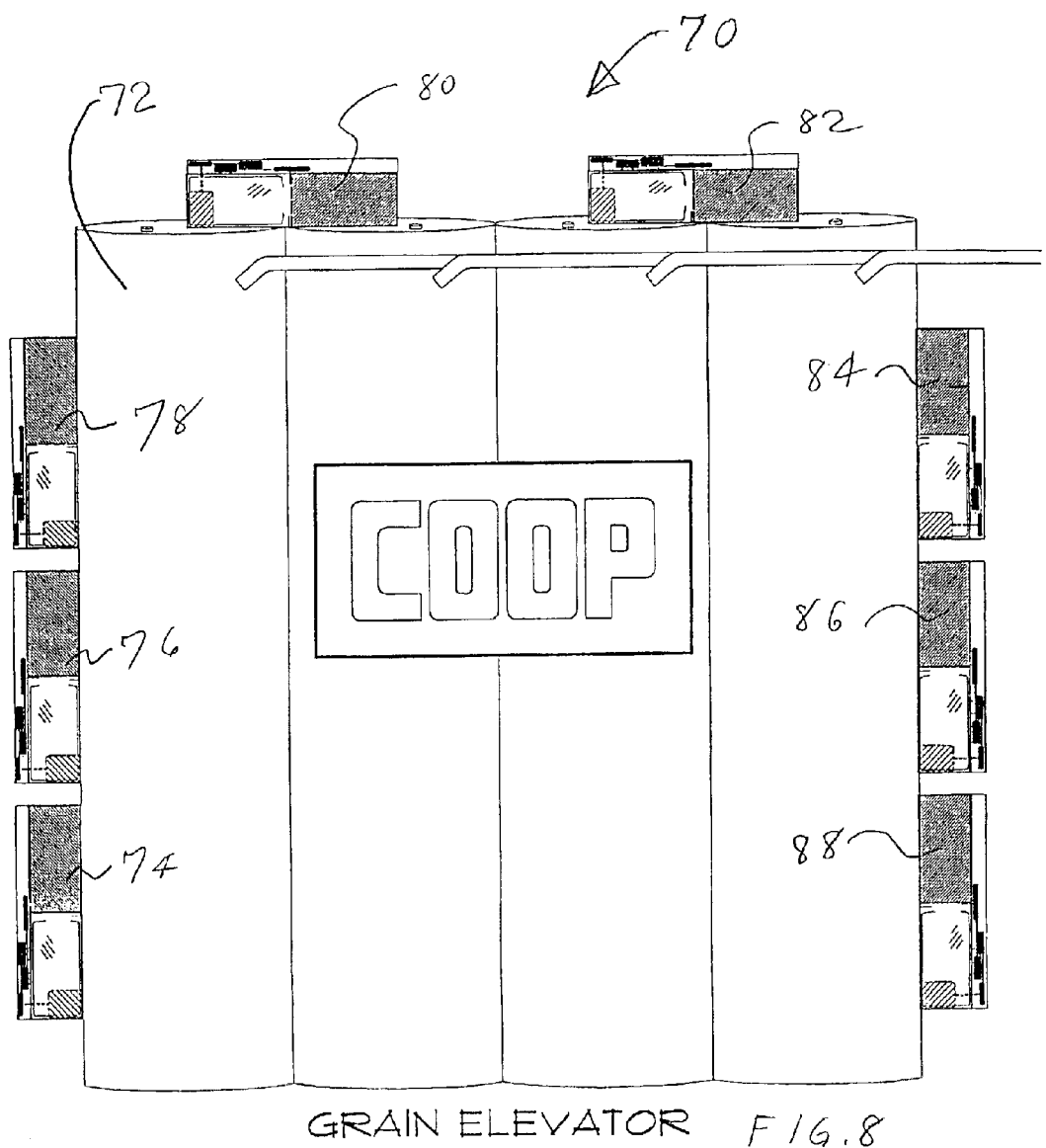
GRAIN ELEVATOR  FIG.8

WIND TURBINE GENERATOR

CROSS-REFERENCE TO RELATED APPLICATIONS

This application is a Continuation-in-Part of Application Ser. No. 60/304,535 filed Jul. 10, 2001.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to wind generated electricity, and in one of its aspects, to wind turbine generators.

2. Description of Related Art

Wind turbine generators have been built using wind deflectors, such as shown in U.S. Pat. No. 5,375,968 (Kollitz et al.). At least some have adapted wind turbine generators to a specific structure as shown in U.S. Pat. No. 5,844,324 (Spriggle) which is adapted to fit on top of a motor vehicle.

BRIEF SUMMARY OF THE INVENTION

A wind turbine generator according to the present invention will provide power from the wind to operate lights and essential devices, reducing the cost of electricity purchased.

A wind turbine generator according to the present invention is a type of insurance that will provide uninterrupted power during blinks or total outages for an extended period, and possibly indefinitely with sufficient wind.

A wind turbine generator according to the present invention can drastically reduce the peak demand for electricity in areas by generating or storing the minimum required power during off peak times. Electric rates (i.e. Time of use) are available in some areas that reduce off peak rates drastically.

A wind turbine generator according to the present invention will provide low and no cost power by utilizing fluid pressure differentials (i.e. wind) created by structures for rural and urban homes, businesses and buildings with a small initial investment and low maintenance using readily available parts. A wind turbine generator with an alternating current (AC) generator will provide power during power outages or reduce electric expense. A wind turbine generator with a direct current (DC) generator will also provide stored power during power outages or for recharging DC powered autos and appliances or reduce Highway Dept. expenses during winter storms.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 1 is a top sectional view of a wind turbine generator according to the present invention;

FIG. 2 is a front view of the wind turbine generator of FIG. 1;

FIG. 3 is a top view of a wind turbine generator of the present invention in use with a pair of oil or gasoline tanks;

FIG. 4 is a front view of the wind turbine generator in use with a pair of oil or gasoline tanks of FIG. 3;

FIG. 5 is front view of a house having several wind turbine generators according to the present invention;

FIG. 6 is a rear view of the house having several wind turbine generators of FIG. 5;

FIG. 7 is a right side view of the house having several wind turbine generators of FIG. 5; and FIG. 8 is a side view of a grain elevator having several wind turbine generators according to the present invention.

DETAILED DESCRIPTION OF THE INVENTION

Referring now to the drawing, and in particular to FIG. 1 and FIG. 2, a wind turbine generator according to the present invention is referred to generally by reference numeral 10. Wind turbine generator 10 includes wind driven blades 12 arranged around a hub 14. As hub 14 is turned by wind driven blades 12, it drives belt 16 which in turn drives electric generator 18. Wind turbine generator 10 further includes a simple boxlike frame 20 which forms a wind blocking wall 22 for blocking wind from blowing against wind driven blades 12 in the reverse direction. Drive belt 16 can, of course, be a drive chain or any other mechanical drive.

Referring now to FIG. 3 and FIG. 4, a wind turbine generating system according to the present invention for use with oil or gas tanks is referred to generally by reference numeral 30. A wind turbine generator 32 is placed between tanks 34 and 36 to take advantage of the natural wind channeling between the two tanks. The wind will be channeled toward wind driven blades 38.

Referring also to FIG. 5, FIG. 6 and FIG. 7, a wind turbine generating system according to the present invention for use with a house is referred to generally by reference numeral 50. System 50 includes wind turbine generators 52, 54 and 56 built into the side of a house 58, into the top of a roof 60 and into the middle of roof 60 respectively. System 50 also includes wind turbine generators 62 and 64 added on to the side of house 58 and on top of roof 60 respectively.

Referring to FIG. 8, a wind turbine generating system according to the present invention is referred to generally by reference numeral 70. A large structure such as a grain elevator 72 can support numerous wind turbine generators 74, 76, 78, 80, 82, 84, 86 and 88 for generating electricity for use off-site. Generators 74, 76, 78, 84, 86 and 88 are mounted on the sides of grain elevator 72, and generators 80 and 82 are mounted on top. Since grain elevator 72 blocks the wind, it redirects the wind at an increased speed through the wind turbine generators.

A wind turbine generator according to the present invention is most beneficial when mounted on existing structures (i.e. homes, barns, grain elevators, office buildings, oil tanks and offshore oil platforms). There is no need for a tower that must be lowered or climbed for repairs and maintenance. A wind turbine generator according to the present invention DC model can utilize an auto alternator, available at any auto parts store.

A wind turbine generator can be installed on approximately 70% of homes, office buildings and other structures, reducing fossil fuel generated electricity by 10 to 20% nationwide. A wind turbine generator according to the present invention installed on autos and trucks can reduce fuel consumption 3 to 5%. With DC stored power at more locations, DC powered autos will he more acceptable to drive from home to work, using pollution free non fossil fuel generated power.

A home style wind turbine generator according to the present invention, 8 ft. by 2 ft. can be constructed of tin or aluminum for approx. $2000, or less, and could be shipped and installed for $3000 depending on location, A water drive wind turbine generator can be constructed of fiberglass for $3000, or less. A cast iron or heavy metal drive for auto or truck can be built for approximately $500. I have built an 8 ft. by 21 in. model utilizing ½ in. plywood for a cost of less than $750.

A wind turbine generator according to the present invention can be built at a low cost, allowing a rapid payout. The low cost allows multiple installations on any structure to utilize all wind directions. The number of installation types (homes, offices, oil and grain tanks, offshore platforms, autos, trucks, stationary engines) creates a large market. The major energy contribution would be realized with a home, etc. wired for halogen DC lighting and DC appliances like a motor home (with inverters for AC appliances), a connecting device to charge the DC commuter car or rechargeable devices (lawn mower, flashlight, drill, etc.). A home or office set up for DC could charge up at night, i.e. a California ice cream plant, when power is less expensive, thereby, reducing brown or blackouts due to over demand on electric companies.

The fluid (wind and water) currents created by various structures and the resultant force produced utilizing the high and low pressure differentials must be researched. To take full advantage of the pressure differentials each structure will develop based on various fluid directions. Once differentials are established the proper blade width and length can be determined to provide the minimum torque. The shape and pressure control of the blades may require extensive research. Due to the numerous applications, installations, styles and materials, there is a great deal of research to be considered.

A great reduction in fossil fuel usage by utilities can best be accomplished by providing onsite generators at as many locations as possible at the lowest price. The biggest problem with current wind generators is that they require towers and constant speed transmissions to provide 60 cycle AC. A wind turbine generator according to the present invention uses the wind currents around buildings and structures to eliminate the tower, and a DC generator to eliminate the transmission. Installation on existing buildings makes the wind turbine generator more attractive with ease of access for maintenance. DC power can be stored to take advantage of strong wind gusts or can he recharged during low wind periods, preferably during low utility demand periods (late night). Recent advances in DC alternators, battery storage, lighting, motors, appliances and electric commuter cars, etc. would strongly suggest that a home or office can operate with the same efficiency.

A wind turbine generator according to the present invention uses the high wind currents around structures to produce power by channeling a high pressure zone to a low pressure zone. The pressure differential will create the force to turn the blades of a wind turbine generator according to the present invention. Any pressure differential that is created by wind, water or motor exhaust can become the driving force.

The basic design of a wind turbine generator can be adjusted along the X and Y dimensions to fit any application or pressure requirements (examples 2 to 18 ft. tall and 4 to 100 ft. square). The wind openings can be 2, 3 or 4 depending on the installation.

An exhaust mounted wind turbine generator according to the present invention model would be only inches in diameter for an automobile or 2 ft. for a large diesel. This installation could eliminate the need for a muffler and reduced belt drag on the motor's horsepower.

A wind turbine generator according to the present invention is best when mounted on an existing structure, or built on new structures, using the surface of the structure as a funnel to channel the wind into the blades, A 20 mph wind at 30 ft. above ground level is 50 to 80% less at ground level; however once it strikes a structure and is funneled around a corner, the velocity is 195 to 21.0% of the original wind speed. The structure also creates a low pressure area on the leeward side, lowering the discharge pressure. By using a wind turbine generator box configuration to take full advantage of the pressure differential the wind velocity will increase.

The higher a wind turbine generator according to the present invention is mounted, the higher the wind speed, no matter where it is mounted on a structure. It is much easier to work on than a tower mounted generator. A tall building would be far better than a one level home, yet the maintenance would be just as easy. Large structures like a grain elevator or highway overpass can utilize blades 25 to 50 ft. with an AC generator or numerous DC generators. This configuration would provide a safety benefit also, by converting the dangerous strong wind currents to useful energy.

A wind turbine generator according to the present invention is not limited to wind currents. The same basic principal can be adapted to offshore platforms using the wind and water. Mounting a wind turbine generator according to the present invention on the legs below the low water line would use the inherent currents much the same way. Piers out in the ocean can use the tides. Piers along flowing rivers would provide a more constant power supply.

A wind turbine generator would use a DC generator (alternator), bearings, belts and batteries that could be purchased from any auto parts store, making repairs easy and inexpensive.

A 12, 24, or 36 volt DC system is much safer than 120 volt AC when there is a shock or someone comes in contact with the plug in.

A wind turbine generator according to the present invention can be installed on rural and urban homes, office buildings and many other structures allowing many generating points; thereby greatly reducing fossil fuel generated power. A drop of rain may not be significant; however, many drops can create a flood. A 10% reduction to only 25% of homes etc. in the U.S. would be a very significant savings of coal, gas, and oil. There are millions of structures that can be utilized, some with multiple installations.

The main impact of a wind turbine generator according to the present invention is to provide usable energy, not to resell back to existing power companies. The energy created will depend on wind available, number of generators, storage capacity and devises to use the power. A home on the coast with consistent sea breeze, adequate generators, and storage capacity, could be 50 to 100% self sufficient.

The cost to construct such a device is substantially lower than the present models due in large part to the use of DC generators and the lack of any transmission. The conversion to AC can be accomplished with the use of inverters to power appliances or on a windy day, when batteries are at full voltage, the excess can be regulated to be inverted back to the utility company. Conversely, AC chargers can be regulated to recharge the batteries on high use or low wind days.

The main cost to a consumer would include installation of a bank of batteries and DC wiring for lights and connectors. This provides a safety factor in that DC can not cause deadly electric shock. DC lights last longer, helping reduce the pay out.

Present wind generators are in the $40,000.00 range, and for that price a consumer can purchase or have built-in 20 wind turbine generators according to the present invention.

A wind turbine generator according to the present invention can be used by anyone that has wind currents blowing around a structure, and wants to save on their electric bills, charge an electric car, or have emergency power.

The design of each wind turbine generator will be determined by the shape and size of the structure. Examples of existing structures that would benefit with the installation of a wind turbine generator are:

HOMES
BARNS
OFFICES
OIL TANKS
GRAIN ELEVATORS
OFFSHORE OIL PLATFORMS
HIGHWAY OVERPASSES
CLIFFS
TRUCKS
AUTOMOBILES
STATIONARY MOTORS.

The attached drawings demonstrate the various installation locations that would be available on some of the above structures.

The blade length and width can be designed to fit the space available or the required torque to provide the maximum generated energy with a minimal wind speed.

The installations on homes, barns, offices, oil tanks, grain elevators, and offshore oil platforms can use the power on site or, utilizing an inverter, the power can be sold back to the utility company. Installations on highway overpasses and cliffs can also use the power for recharging DC powered commuter vehicles or provide power in remote areas where utility power is not available. Installations on the exhaust of trucks, automobiles and stationary motors can reduce the belt drag which uses 3 to 5% of an engines horsepower. This installation can reduce or eliminate the need for a muffler.

A wind turbine generator according to the present invention can be set up with an AC generator at a much higher cost; however, I believe the DC version is simple and more cost effective, A home set up with DC lights, appliances and DC to AC inverters will use less fossil-fuels and have power during blackouts. An automobile can be connected to the system to recharge in the event of long-term outages, providing some conveniences and security. Homes, etc. today have numerous rechargeable or DC powered devices (flashlights, telephones, drills, hand mixers, even computer games, i.e. SEGA) that could eliminate the AC converters and use of fossil-fuel by having DC power readily available. A computer connected to a voltage regulated DC to AC inverter would not have problems due to power company blips, causing loss of information and possible damage.

A highway overpass with wind turbine generator can provide lighting, stored power to recharge electric cars, or heat the road surface with heat tape or a small mobile home propane heater to prevent winter icing (reducing highway dept. expenses and reducing accidents).

The exact wind velocities and pressure differentials created around each structure, and the relationship to various wind directions must be determined to coordinate the blade width and length to maximize the torque at even the lowest wind speeds. Numerous anemometers set up on various structures at the same time would best determine the most beneficial locations for a particular area, wind speed, and wind direction.

The construction will basically be limited to weather resistant materials like fiberglass, aluminum, or composites; however, a portable unit could be made of canvas, plastics and aluminum frame, like a large tent, to be assembled in remote or disaster areas.

The blade design should be in such a manner as to give a unidirectional rotation to insure proper operation. The design will have to take into account maximum torque at low wind speed and stay intact during stormy gusts. A design allowing the blades to free spin with a momentary gust would take advantage of the velocity and not cause the blade momentum to act as a fan. A ratchet system with centripetal weights would allow the generator to spin till the blades catch up. The basic design must allow for blades of various widths and lengths.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the figures of the accompanying drawings is to be interpreted as illustrative and not in a limiting sense.

What is claimed is:

1. A wind turbine generator comprising in combination:
    a hub;
    a plurality of wind driven blades arranged around the hub;
    a mechanical drive driven by the plurality of blades;
    an electric generator driven by the mechanical drive; and
    a boxlike frame having four substantially straight sides forming at least two wind blocking walls for blocking wind from blowing against any of the plurality of wind driven blades in the reverse direction.

2. A wind turbine generator according to claim 1, further comprising two oil or gas tanks, wherein the boxlike frame is placed between the tanks to take advantage of the natural wind channeling between the two tanks.

3. A wind turbine generator according to claim 1 further comprising a house, wherein the boxlike frame is built into the side of the house.

4. A wind turbine generator according to claim 1 further comprising a building, wherein the boxlike frame is built into the side of the building.

5. A wind turbine generator according to claim 1 further comprising a roof, wherein the boxlike frame is built into the top of the roof.

6. A wind turbine generator according to claim 1 further comprising a roof, wherein the boxlike frame is built into the middle of the roof.

* * * * *